United States Patent
Sakadjian et al.

(10) Patent No.: US 9,200,622 B2
(45) Date of Patent: Dec. 1, 2015

(54) SOLAR-NUCLEAR HYBRID POWER PLANT

(71) Applicant: Babcock & Wilcox Power Generation Group, Inc., Barberton, OH (US)

(72) Inventors: Bartev B Sakadjian, North Canton, OH (US); William A Arnold, Akron, OH (US); David L Kraft, Massillon, OH (US)

(73) Assignee: The Babcock & Wilcox Company, Barberton, OH (US)

( * ) Notice: Subject to any disclaimer, the term of this patent is extended or adjusted under 35 U.S.C. 154(b) by 393 days.

(21) Appl. No.: 14/047,697

(22) Filed: Oct. 7, 2013

(65) Prior Publication Data

US 2015/0096299 A1 Apr. 9, 2015

(51) Int. Cl.
| | |
|---|---|
| *F03G 6/00* | (2006.01) |
| *G21D 5/00* | (2006.01) |
| *G21D 5/16* | (2006.01) |
| *G21D 1/00* | (2006.01) |
| *G21D 5/10* | (2006.01) |
| *F22B 1/00* | (2006.01) |
| *F22B 1/12* | (2006.01) |
| *F22B 1/16* | (2006.01) |

(Continued)

(52) U.S. Cl.
CPC ............... *F03G 6/003* (2013.01); *F01K 13/00* (2013.01); *F03G 6/005* (2013.01); *F22B 1/006* (2013.01); *F22B 1/023* (2013.01); *F22B 1/123* (2013.01); *F22B 1/162* (2013.01); *G21D 1/00* (2013.01); *G21D 1/006* (2013.01); *G21D 5/10* (2013.01); *G21D 5/16* (2013.01); *Y02E 10/46* (2013.01)

(58) Field of Classification Search
CPC ........... G21D 1/006; G21D 5/08; G21D 5/10; G21D 5/12; G21D 5/14; G21D 5/16; Y02E 10/46; F03G 6/003; F03G 6/005; F03G 6/065; F03G 6/067; F24J 2/42; F22B 1/023; F22B 1/006; F22B 1/123; F22B 1/162; F22B 1/1823; F22B 1/063; F22B 1/143; F01K 13/00
USPC ............................................ 60/641.8–641.15
See application file for complete search history.

(56) References Cited

U.S. PATENT DOCUMENTS

| | | | | |
|---|---|---|---|---|
| 3,171,791 | A * | 3/1965 | Wootton | ........................ 376/402 |
| 3,344,776 | A * | 10/1967 | Dahlgren | ......................... 122/32 |

(Continued)

FOREIGN PATENT DOCUMENTS

WO WO 2013132132 A2 * 9/2013

OTHER PUBLICATIONS

Petrovic, Bojan, NuRenew Hybrid Nuclear (LSCR)—Renewable (CSP) Energy Park, PowerPoint presentation, I-NEST Nuclear Hybrid Energy Systems Workshop, Apr. 2012, Salt Lake City, UT, USA.

(Continued)

*Primary Examiner* — Thomas Denion
*Assistant Examiner* — Xiaoting Hu
(74) *Attorney, Agent, or Firm* — Eric Marich (57) ABSTRACT

A solar-nuclear hybrid plant includes a nuclear energy loop, a solar energy loop, and an electrical generation loop. The three loops are closed loops. The nuclear energy loop transfers energy to the electrical generation loop through a steam generator. The solar energy loop transfers energy to either the nuclear energy loop and/or the electrical generation loop through one or more heat exchangers in the appropriate loop. This cogeneration plant has higher efficiency compared to a nuclear power plant alone.

20 Claims, 3 Drawing Sheets

(51) Int. Cl.
*F22B 1/02* (2006.01)
*F01K 13/00* (2006.01)

(56) References Cited

U.S. PATENT DOCUMENTS

| | | | |
|---|---|---|---|
| 3,575,002 A * | 4/1971 | Vuia | 376/317 |
| 3,943,719 A * | 3/1976 | Terry et al. | 376/324 |
| 4,093,514 A * | 6/1978 | Iljunin et al. | 376/207 |
| 4,438,630 A * | 3/1984 | Rowe | 60/676 |
| 4,471,618 A * | 9/1984 | Tratz et al. | 60/646 |
| 4,530,814 A * | 7/1985 | Schluderberg | 376/317 |
| 5,361,377 A * | 11/1994 | Miller | 376/211 |
| 5,526,386 A * | 6/1996 | Tsiklauri et al. | 376/317 |
| 7,954,321 B2 | 6/2011 | Shinnar | |
| 8,286,429 B2 | 10/2012 | Heide et al. | |
| 8,291,704 B2 | 10/2012 | Chaki et al. | |
| 2005/0279095 A1 * | 12/2005 | Goldman | 60/641.8 |
| 2006/0266039 A1 * | 11/2006 | Skowronski et al. | 60/641.8 |
| 2010/0316181 A1 | 12/2010 | Thome et al. | |
| 2011/0137480 A1 | 6/2011 | Sampson et al. | |
| 2011/0302921 A1 * | 12/2011 | Ferguson et al. | 60/641.8 |
| 2012/0102950 A1 * | 5/2012 | Turchi | 60/641.15 |
| 2012/0255309 A1 | 10/2012 | Venetos et al. | |
| 2014/0182576 A1 * | 7/2014 | Harats et al. | 126/572 |
| 2015/0033742 A1 * | 2/2015 | Herrazti Garcia et al. | 60/653 |

OTHER PUBLICATIONS

Stultz, et al., "Nuclear Steam Generators," Steam: its energy and use, Copyright 2005, Ch 48, 15 pp, The Babcock & Wilcox Company.

* cited by examiner

SOLAR-NUCLEAR HYBRID POWER PLANT

BACKGROUND

The present disclosure relates broadly to the field of power generation used to produce electricity. More particularly, this disclosure relates to power plants and systems which combine solar power and nuclear power to increase efficiency compared to a nuclear plant alone. The solar-nuclear hybrid plants can help meet the world's need for a sustainable, carbon-free (i.e., green) source of energy.

Both solar energy and nuclear energy are viable carbon-free sources of power. They both offer the means to produce electricity with minimal carbon footprint and with minimal/no fuel cost. However, solar activity is variable, which means solar energy production is variable. Nuclear power is not variable, but has a relatively low efficiency due to inherent limitations in systems design.

It would be desirable to reduce the variability of energy output from a solar power plant. It would also be desirable to produce higher pressure and/or temperature steam than can be produced by a nuclear power plant, so that more energy can be extracted per unit mass.

BRIEF DESCRIPTION

The present disclosure relates to a solar-nuclear hybrid power system that combines a solar energy loop with a nuclear energy loop. The solar energy loop can attain higher temperatures compared to the nuclear energy loop, and transfer that heat energy to steam. This solar-nuclear hybrid/cogeneration plant can have improved operation and efficiency, compared to a nuclear plant. Method of operating the hybrid plant with the nuclear power generation and solar power generation system operating in tandem are also disclosed. Heat transfer fluids/media are used to facilitate the integration of the solar and nuclear power generation systems.

Disclosed herein in various embodiments is a solar-nuclear hybrid electrical generation plant, comprising: a nuclear energy loop including a primary fluid that runs through a nuclear reactor and a steam generator downstream of the nuclear reactor; a solar energy loop including heat transfer fluid that runs through a solar receiver and at least one heat exchanger downstream of the solar receiver; and an electrical generation loop including a secondary fluid that runs through the steam generator of the nuclear energy loop and at least one turbine downstream of the steam generator; wherein at least one of the primary fluid and the secondary fluid also runs through the at least one heat exchanger in the solar energy loop, so that heat energy is transferred from the heat transfer fluid to the primary fluid or the secondary fluid.

The at least one heat exchanger may comprise a superheater located in the electrical generation loop between the steam generator and the at least one turbine. The at least one turbine can include a high-pressure turbine and a low-pressure turbine downstream of the high-pressure turbine, and wherein the at least one heat exchanger further comprises a reheater located in the electrical generation loop between the high-pressure turbine and the low-pressure turbine. The at least one heat exchanger may further comprise a primary water heater located in the nuclear energy loop between the nuclear reactor and the steam generator, wherein the primary water heater is downstream of the reheater in the solar energy loop. The at least one heat exchanger may further comprise a preheater located in the electrical generation loop upstream of the steam generator and downstream of the at least one turbine, wherein the preheater is downstream of the primary water heater in the solar energy loop.

In some other embodiments, the at least one heat exchanger includes the superheater, reheater, and further comprises a preheater located in the electrical generation loop upstream of the steam generator and downstream of the at least one turbine, wherein the preheater is downstream of the reheater in the solar energy loop.

In other embodiments, the at least one heat exchanger includes the superheater, and further comprises a primary water heater located in the nuclear energy loop between the nuclear reactor and the steam generator, wherein the primary water heater is downstream of the superheater in the solar energy loop. The at least one heat exchanger can further comprise a preheater located in the electrical generation loop upstream of the steam generator and downstream of the at least one turbine, wherein the preheater is downstream of the primary water heater in the solar energy loop.

In different embodiments, the at least one heat exchanger includes the superheater, and further comprises a preheater located in the electrical generation loop upstream of the steam generator and downstream of the at least one turbine, wherein the preheater is downstream of the superheater in the solar energy loop.

In other embodiments, the at least one turbine includes a high-pressure turbine and a low-pressure turbine downstream of the high-pressure turbine, and wherein the at least one heat exchanger comprises a reheater located in the electrical generation loop between the high-pressure turbine and the low-pressure turbine. The at least one heat exchanger can further comprise a primary water heater located in the nuclear energy loop between the nuclear reactor and the steam generator, wherein the primary water heater is downstream of the reheater in the solar energy loop. The at least one heat exchanger can further comprise a preheater located in the electrical generation loop upstream of the steam generator and downstream of the at least one turbine, wherein the preheater is downstream of the primary water heater in the solar energy loop.

In some embodiments, the at least one heat exchanger includes the reheater, and further comprises a preheater located in the electrical generation loop upstream of the steam generator and downstream of the at least one turbine, wherein the preheater is downstream of the reheater in the solar energy loop.

In various embodiments, the at least one heat exchanger comprises a primary water heater located in the nuclear energy loop between the nuclear reactor and the steam generator. The at least one heat exchanger can further comprise a preheater located in the electrical generation loop upstream of the steam generator and downstream of the at least one turbine, wherein the preheater is downstream of the primary water heater in the solar energy loop.

In continuing embodiments, the at least one heat exchanger comprises a preheater located in the electrical generation loop upstream of the steam generator and downstream of the at least one turbine.

The solar energy loop may further comprise a cold tank and a hot tank, the hot tank being located downstream of the solar receiver and upstream of the at least one heat exchanger, and the cold tank being located upstream of the solar receiver and downstream of the at least one heat exchanger. In certain constructions, cooler fluid from the cold tank can be mixed with hotter fluid from the hot tank prior to sending the heat transfer fluid through the at least one heat exchanger.

Also disclosed in embodiments herein is a solar-nuclear hybrid electrical generation plant, comprising: a nuclear energy loop including a primary fluid that runs through a nuclear reactor and a steam generator downstream of the nuclear reactor; a solar energy loop including heat transfer fluid that runs through a solar receiver and two or more heat exchangers downstream of the solar receiver; and an electrical generation loop including a secondary fluid that runs through the steam generator of the nuclear energy loop, a higher pressure turbine stage downstream of the steam generator, and a lower pressure turbine stage downstream of the higher pressure turbine stage; wherein solar energy is transferred from the heat transfer fluid to the primary fluid or the secondary fluid through the two or more heat exchangers; and wherein the two or more heat exchangers are selected from the group consisting of: (A) a superheater located in the electrical generation loop downstream of the steam generator and upstream of the higher pressure turbine stage; (B) a reheater located in the electrical generation loop between the higher pressure turbine stage and the lower pressure turbine stage; (C) a primary water heater located in the nuclear energy loop downstream of the nuclear reactor and upstream of the steam generator; and (D) a preheater located in the electrical generation loop upstream of the steam generator and downstream of the lower pressure turbine stage.

These and other non-limiting aspects and/or objects of the disclosure are more particularly described below.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

A more complete understanding of the processes and apparatuses disclosed herein can be obtained by reference to the accompanying drawings. These figures are merely schematic representations based on convenience and the ease of demonstrating the existing art and/or the present development, and are, therefore, not intended to indicate relative size and dimensions of the assemblies or components thereof.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The singular forms "a," "an," and "the" include plural referents unless the context clearly dictates otherwise.

As used in the specification and in the claims, the term "comprising" may include the embodiments "consisting of" and "consisting essentially of."

Numerical values should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams to 10 grams" is inclusive of the endpoints, 2 grams and 10 grams, and all the intermediate values).

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. The modifier "about" should also be considered as disclosing the range defined by the absoluter values of the two endpoints. For example, the expression "from about 2 to about 4" also discloses the range "from 2 to 4."

It should be noted that many of the terms used herein are relative terms. For example, the terms "inlet" and "outlet" are relative to a fluid flowing through them with respect to a given structure, e.g. a fluid flows through the inlet into the structure and flows through the outlet out of the structure. The terms "upstream" and "downstream" are relative to the direction in which a fluid flows through various components, i.e. the flow fluids through an upstream component prior to flowing through the downstream component. It should be noted that in a loop, a first component can be described as being both upstream of and downstream of a second component. The terms "upper" and "lower" are relative to each other in location, i.e. an upper component is located at a higher elevation than a lower component.

To the extent that explanations of certain terminology or principles of the solar, nuclear, and/or steam generator arts may be necessary to understand the present disclosure, the reader is referred to *Steam/its generation and use,* 40th Edition, Stultz and Kitto, Eds., Copyright 1992, The Babcock & Wilcox Company, and to *Steam/its generation and use,* 41st Edition, Kitto and Stultz, Eds., Copyright 2005, The Babcock & Wilcox Company, the texts of which are hereby incorporated by reference as though fully set forth herein.

The present disclosure relates to a combination of a nuclear power plant with a solar energy power plant. With the advent of technologies that are being developed to harness the energy from renewable sources including the sun, and the revival of the nuclear power industry, these two technologies can be combined in a cogeneration plant to produce power in ways that can complement each other.

Nuclear energy steam turbines typically produce steam at relatively low/moderate pressures and temperatures with lower levels of superheat compared to conventional fossil fuel-fired plants. For example, a nuclear steam supply system may provide steam at 910 psia and 595° F., compared to a typical steam cycle associated with fossil fuel combustion systems that operates at pressures of 1800-3600 psia and temperatures of 1000° F. or higher. One reason for this difference is that nuclear rod assemblies can only operate within certain temperature limits, inherently limiting the design possibilities for nuclear systems. In order to ensure proper cooling of the rod assemblies, the primary fluid in nuclear power systems is pressurized sufficiently to remain in a single phase (i.e., liquid phase) throughout the entire loop. On the secondary side of the nuclear steam generator, water is evaporated to produce saturated steam. In some systems, the steam generator raises the temperature of steam above saturation, though typically less than 100° F. above saturation.

A solar receiver is generally used as a component of a solar energy generation system whereby radiation from the sun (i.e. sunlight) is used as a heat source. The radiation and heat energy from the sun is transferred to a working fluid which is used to ultimately generate electricity through the use of turbines, etc. The receiver is usually a large unit permanently mounted on top of an elevated support tower that is strategically positioned in a field of heliostats, or mirrors, that collect rays of sunlight and reflect those rays back to target walls in the receiver. Solar activity is variable. Accordingly, a constant energy output from a solar plant can be difficult to achieve.

The use of molten salt as the heat transfer fluid (HTF) instead of steam and water in the solar receiver can be used to store the solar energy in order to generate power at night as well. Such molten salts can include sodium nitrate salts and potassium nitrate salts. "Cold" molten salt at an inlet temperature of about 550° F. (288° C., 561° K) is pumped from a cold molten salt storage tank into the solar receiver. The solar energy focused on the receiver heats the molten salt to an outlet temperature of about 1050° F.-1175° F. (566° C.-635° C., 839° K-908° K), depending on the salt used. Upon exiting the solar receiver, this "hot" molten salt is returned to grade level and stored in a hot molten salt storage tank. This completes the energy collection process. While the present disclosure refers to molten salt as the heat transfer fluid, it should be noted that other fluids/media are also contemplated for use. The heat transfer fluid can be a molten salt, such as a sodium nitrate or potassium nitrate or a mixture thereof. Alternatively, the heat transfer fluid can be selected from other high temperature working fluids such as other salts (fluorides, chlorides, nitrites etc.), liquid metals (such as liquid sodium or liquid sodium potassium (NaK), etc.) and other phase change materials. The heat transfer fluid/media may also be selected from solid particles which may include but are not limited to sand, alumina, and silicon carbide, to name a few. The heat transfer fluid/media selected should allow heating in the solar receiver to high temperatures, typically greater than 550° F.

When desired, electricity is generated by pumping the hot salt from the hot salt storage tank to a steam generation system. This is a system of heat exchangers that transfers the thermal energy from the hot molten salt to water in order to produce high temperature, high pressure steam. The steam is then used to drive a conventional Rankine turbine generator. This completes the power generation process. The cooled salt returns to a cold salt storage tank and can be recirculated through the solar receivers.

This arrangement allows the collection of energy at the solar receiver to be decoupled from the power generation. Energy storage is very desirable to a utility because the plant can produce and dispatch electricity as needed, such as during cloud cover and at night, for some amount of time depending on the size of the thermal storage system.

Thus, while a nuclear steam generation system typically operates at low temperatures near steam saturation conditions, molten salts used in solar steam generation systems operate in a temperature window significantly above those produced by a nuclear power system. The Rankine cycle efficiency increases as the steam temperature increases. Thus, in the present disclosure the energy captured via solar power is used to increase the temperature of the steam produced via nuclear power.

Figure 1:
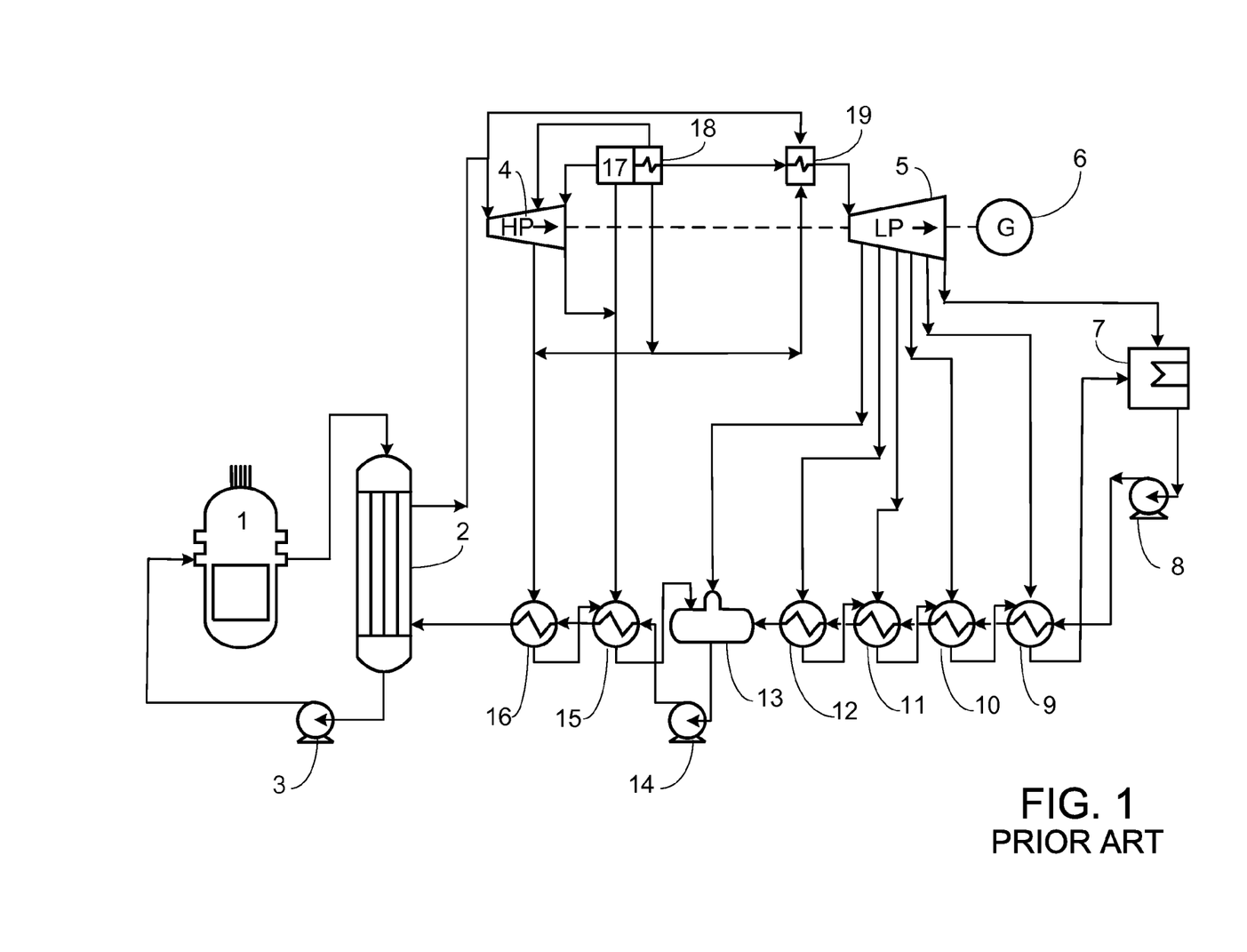
FIG. 1 (prior art) depicts a typical power cycle diagram that uses nuclear fuel to provide heat to a primary fluid/coolant in a pressurized water reactor.

FIG. 1 is a diagram illustrating a conventional nuclear power cycle. Two fluid loops are present, a nuclear energy loop (primary loop) and an electrical generation loop (secondary loop). The nuclear energy loop includes a primary fluid that runs through the nuclear reactor 1, steam generator 2, and pump 3 depicted here. The electrical generation loop includes a secondary fluid that runs through the steam generator, a higher pressure turbine stage 4, a lower pressure turbine stage 5, various heat exchangers 7, 12, 15, 16, 18, 19, and the deaerator 13. Both loops are closed loops, i.e. the primary fluid does not mix with the secondary fluid.

In the nuclear energy loop, the high pressure primary fluid/coolant (e.g. water) flows through the reactor 1 and absorbs energy. The fluid then flows through the primary side of a steam generator 2 located downstream of the reactor, where the heat energy is transferred to the secondary side (i.e. the electrical generation loop). The pump recycles water exiting the steam generator back to the reactor 1.

In the electrical generation loop, the secondary fluid (e.g. water) enters the secondary side of the steam generator 2 and absorbs heat energy from the primary side to produce saturated steam or steam at a temperature above saturation (usually less than 100° F. over the saturation temperature). The steam is used to power at least one turbine located downstream of the steam generator. In the depicted embodiment, the at least one turbine includes a high pressure turbine 4 and a low pressure turbine 5. In some embodiments, one or more intermediate pressure turbines (not shown) are also included. The turbines 4, 5 are connected to a generator 6 for power generation.

After expansion in the high pressure turbine, the steam passes through an external moisture separator 17, which removes water from the steam. This water can be sent to the feedwater heater 15. Water can also be removed in the high pressure turbine 4 itself; this water is sent to the feedwater heater 16. The steam is then reheated in two stages. First, the steam is reheated in reheater 18 by bleed steam from the high pressure turbine 4, and then by high-pressure steam in reheater 19, before entering the low pressure turbine 5.

After expansion, steam exiting the low pressure turbine 5 is fed to a condenser 7 which condenses the steam to liquid water. The liquid water is pumped via condensate pump 8 through a plurality of low pressure feedwater heaters 9, 10, 11, 12. Steam is extracted ("extraction steam") from the low pressure turbine 5 and sent to the low pressure feedwater heaters 9, 10, 11, 12 to increase the temperature of the condensed liquid water. Upon transfer of energy, the steam also condenses into liquid water, and is subsequently recycled through condenser 7.

The heated water from the plurality of low pressure feedwater heaters 9, 10, 11, 12 then passes through a deaerating heater 13, also known as a deaerator. The deaerator 13 further heats the feedwater and also removes oxygen and other dissolved gases. The deaerator 13 may be a tray-type deaerator or a spray-type deaerator. Tray-type deaerators include vertical deaeration sections mounted on top of horizontal cylindrical vessels which function as storage tanks. Spray-type deaerators consist of a single cylindrical vessel which functions as both the deaeration section and the storage tank. The cylindrical vessel may be oriented horizontally or vertically.

The feedwater is pumped via feedwater pump 14 from the deaerator 13 through a plurality of high pressure feedwater heaters 15, 16. These high pressure feedwater heaters receive steam which has been extracted from the high pressure turbine, and the steam is used to preheat the feedwater prior to entering the steam generator 2. Upon transferring energy, the steam condenses to liquid water, and that water is subsequently recycled through deaerator 13.

The nuclear reactor 1 can be a pressurized water reactor (PWR). The steam generator 2 can be physically located outside the PWR reactor vessel, or can be physically located within the reactor in an integral PWR configuration. In nuclear reactor designs of the integral pressurized water (integral PWR) type, a nuclear reactor core is immersed in primary coolant water at or near the bottom of a pressure vessel. In a typical design, the primary coolant is maintained in a subcooled liquid phase in a cylindrical pressure vessel that is mounted generally upright (that is, with its cylinder axis oriented vertically). A hollow cylindrical central riser is disposed concentrically inside the pressure vessel. Primary coolant flows upward through the reactor core where it is heated and riser through the central riser, discharges from the top of the central riser, and reverses direction to flow downward back toward the reactor core through a downcomer annulus defined between the pressure vessel and the central riser. In the integral PWR design, the at least one steam generator is located inside the pressure vessel, typically in the downcomer annulus. Some illustrative integral PWR designs are described in Thome et al., "Integral Helical-Coil Pressurized Water Nuclear Reactor", U.S. Pub. No. 2010/0316181 A1 published Dec. 16, 2010 which is incorporated by reference in its entirety. Other light water nuclear reactor designs such as PWR designs with external steam generators, boiling water reactors (BWRs) or so forth, vary the arrangement of the steam generator and other components, but usually locate the radioactive core at or near the bottom of a cylindrical pressure vessel in order to reduce the likelihood of air exposure of the reactor core in a loss of coolant accident (LOCA).

The nuclear reactor core is built up from multiple fuel assemblies. Each fuel assembly includes a number of fuel rods. Control rods comprising neutron absorbing material are inserted into and lifted out of the fuel assembly to control the overall reaction rate. The control rods are supported and guided through control rod tubes which are in turn supported by guide frame tubes. In the integral PWR design, the pressurizer is located at the top of the pressure vessel, with a steam space at the top most point of the pressure vessel. Alternatively, an external pressurizer can be used to control reactor pressure. In order to ensure proper cooling of the rod assemblies, the primary fluid (i.e., coolant) in nuclear generation systems (which is used to keep the nuclear rods cool) is pressurized sufficiently to remain in a single phase (i.e., liquid phase). The primary side pressure may be about 2000 psia or higher, including 2500 psia or higher.

FIG. 1 does not include an exhaustive list of all of the components that may be present in a nuclear system. For example, a demineralizer or other water treatment equipment may be added.

Figure 2:
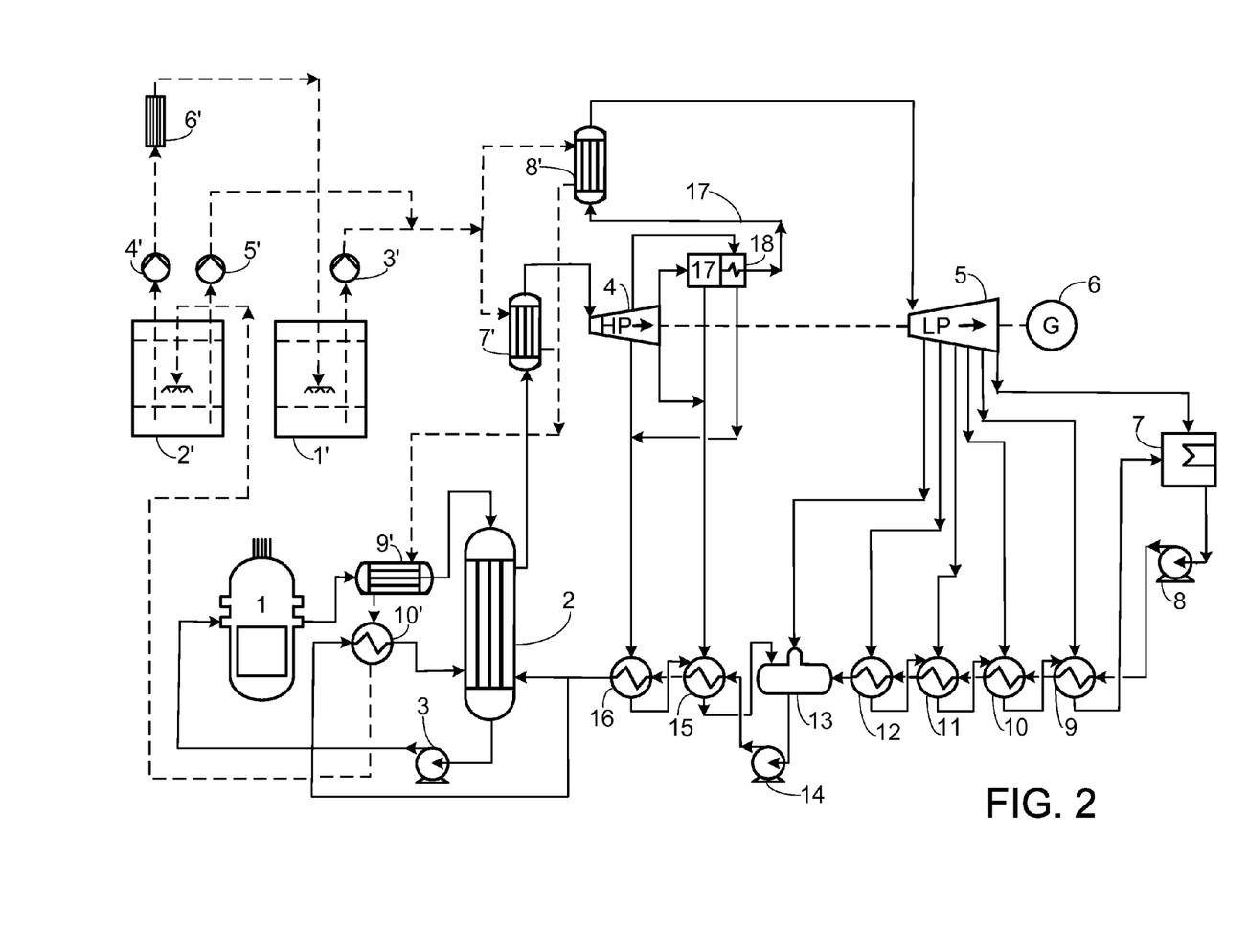
FIG. 2 illustrates a first exemplary embodiment of a solar-nuclear hybrid system of the present disclosure.
Figure 3:
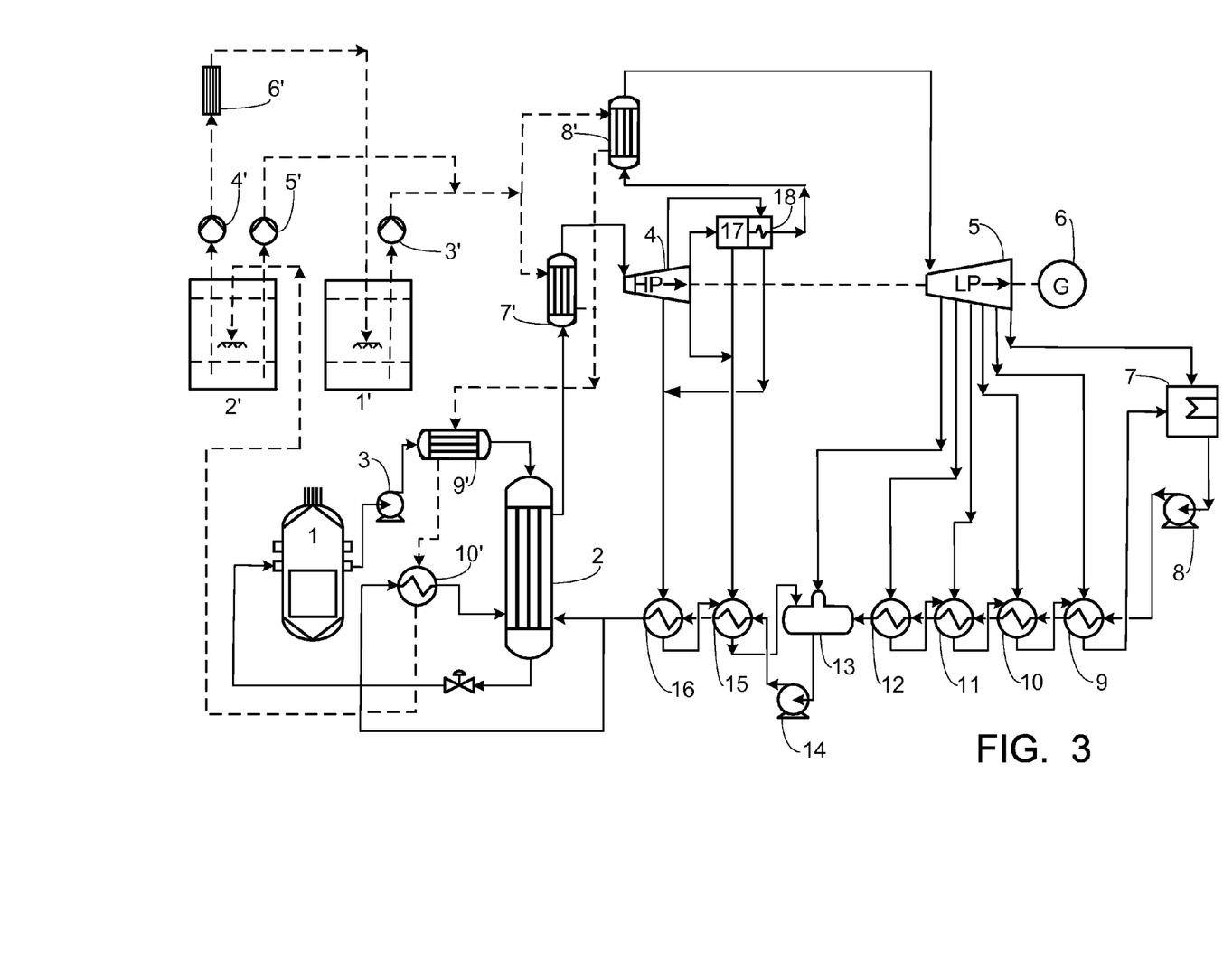
FIG. 3 illustrates a second exemplary embodiment of a solar-nuclear hybrid system of the present disclosure.

FIG. 2 and FIG. 3 illustrate an exemplary solar-nuclear hybrid plant design of the present disclosure. In these figures, a solar energy loop is added to the nuclear energy loop and the electrical generation loop. Elements 1 through 18 are as previously described, and the nuclear energy loop and the electrical generation loop are illustrated with solid lines. The solar energy loop is illustrated by dashed lines and its components are designated with prime (') symbols.

The solar energy loop includes a cold tank 2' for storing cold molten salt, which is located upstream of a solar receiver 6'. A sparger is illustrated in the cold tank 2' for distributing and mixing the salt. In operation, cold molten salt (or other heat transfer fluid) is pumped via cold pump 4' from the cold tank 2' through a molten salt receiver 6'. In the molten salt receiver, the molten salt is heated via solar energy. The heated molten salt is then sent to a hot tank 1' located downstream of the solar receiver. The heated molten salt can be pumped from the hot tank 1' via hot pump 3' for use in the hybrid plant. Cold molten salt may be pumped via attemperation pump 5' from the cold tank 2' to be mixed with the heated molten salt to obtain the desired temperature of the molten salt being sent to the nuclear energy loop and/or electrical generation loop. Alternatively, this pump may be used during transient operation when the molten salt heat exchangers are undergoing startup or shutdown. The pump may also be used to circulate cold salt through the molten salt heat exchangers during standby/idling in order to exchange/move salt and prevent freezing.

Besides the solar receiver 6', the hot tank 1', and the cold tank 2', the heat transfer fluid in the solar energy loop also runs through at least one heat exchanger located downstream of the solar receiver. The solar energy loop is also a closed loop (i.e., the heat transfer fluid cannot mix with the primary fluid or the secondary fluid). Four different heat exchangers are illustrated in FIG. 2 and FIG. 3. These heat exchangers permit thermal energy to be transferred from the solar energy loop to the nuclear energy loop or the electrical generation loop, raising the temperature and/or pressure of the fluid in the given loop. Generally speaking, the heat exchangers are described as being located in two loops. This language refers to the fact that two fluid streams enter a heat exchanger, with energy being transferred from one fluid stream to the other fluid stream.

The first heat exchanger illustrated is superheater 7', which is also located in the electrical generation loop between the steam generator 2 and the turbine 4,5. The solar energy is used to superheat the saturated steam leaving the steam generator 2 prior to the steam being used for electrical generation in the high-pressure turbine 4.

The second heat exchanger illustrated is reheater 8', which is located in the electrical generation loop between the high-pressure turbine and the low pressure turbine. Here, the solar energy is used to reheat low-pressure steam prior to the steam being used for electrical generation in the low-pressure turbine 5. It is noted that in this illustration, the superheater 7' and the reheater 8' are connected in parallel. Put another way, the molten salt stream (i.e. HTF) is split into two separate and distinct fluid streams upstream of the superheater 7' and reheater 8', then rejoined into a single stream downstream of the superheater 7' and reheater 8'.

The rejoined molten salt stream (downstream of the superheater 7' and reheater 8') is fed to the third heat exchanger illustrated here, which is a primary water heater 9' located in the nuclear energy loop between the nuclear reactor 1 and the steam generator 2. The molten salt (HTF) is used here to further heat the primary fluid prior to passing the primary fluid through the steam generator 2. This occurs downstream of the nuclear reactor 1, and allows the transferred solar energy to then be passed to the secondary side of the steam generator (i.e. the electrical generation loop) without exceeding the operating temperature limits of the nuclear rod assemblies in the nuclear reactor. The additional energy can be used to both increase the temperature and increase the pressure of the steam generated on the secondary side of the steam generator.

The fourth heat exchanger illustrated here is preheater 10' located in the electrical generation loop upstream of the steam generator 2 and downstream of the low-pressure turbine 5. The preheater is used to preheat the secondary fluid flowing into the secondary side of the steam generator. Another purpose of the preheater is to cool the molten salt down to the preferred lower operating temperature. This allows the solar plant to circulate less salt by maximizing the heat absorbed per mass of fluid circulated. Without the preheater, the temperature of the molten salt might only be cooled to near the operating temperature of the nuclear reactor 1. In some systems, this may be sufficient and the preheater may not be necessary. In other systems, the preheater would provide advantages which will be reflected in plant efficiency numbers.

FIG. 2 and FIG. 3 differ in the location of the reactor coolant pump 3. In FIG. 2, the reactor coolant pump 3 is located upstream of the nuclear reactor 1 and downstream of the steam generator 2. In FIG. 3, the reactor coolant pump 3 is located downstream of the nuclear reactor 1 and upstream of the steam generator 2. The configuration of FIG. 3 allows the nuclear reactor to operate at a lower pressure compared to the design of FIG. 2. A valve downstream of the steam generator can be used to reduce/control the pressure of the circulating primary fluid before it enters the nuclear reactor.

FIG. 2 and FIG. 3 include all four of these heat exchangers. However, the present disclosure contemplates systems that include only one or any combination of two or more of these heat exchangers. Specifically contemplated are the superheater 7' alone; the reheater 8' alone; the primary water heater 9' alone; the preheater 10' alone; the combination of the superheater 7' and the reheater 8'; the combination of the superheater 7' and the primary water heater 9'; the combination of the superheater 7' and the preheater 10'; the combination of the reheater 8' and the primary water heater 9'; the combination of the reheater 8' and the preheater 10'; the combination of the primary water heater 9' and the preheater 10'; the combination of the superheater 7', the reheater 8', and the primary water heater 9'; the combination of the superheater 7', the reheater 8', and the preheater 10'; the combination of the superheater 7', the primary water heater 9', and the preheater 10'; the combination of the reheater 8', the primary water heater 9', the preheater 10'; and the combination of the superheater 7', the reheater 8', the primary water heater 9', and the preheater 10'.

The addition of the solar energy loop to the nuclear power plant allows higher pressure and/or higher temperature steam to be produced in the electrical generation loop. This is advantageous because the Rankine cycle efficiency increases with increases in steam temperature. Additionally, the levelized cost of electricity may be reduced. The solar power plant will add flexibility to the operation of the nuclear power plant, e.g. using the stored solar energy during peak demand and throttling back during low demand periods. The combination (solar/nuclear) can reduce the extent of cycling on the nuclear energy loop by cycling the solar energy loop instead. The size and split the thermal energy provided by the nuclear energy loop versus the solar energy loop can be adjusted as desired to optimize the overall hybrid power plant. Another advantage is that the amount of nuclear waste generated per MW of electricity produced is reduced, due to the increased efficiency of the overall plant.

The solar-nuclear hybrid power plant can be operated as a base loaded plant or a plant that can cycle in order to generate electricity at different levels based on demand fluctuations. It is contemplated that the plant would be designed to allow operation solely on nuclear power, due to the cyclical nature and variation of power produced by the solar. The turbine would likely have to be a variable pressure turbine. For example, in some embodiments the turbine in the electrical generation loop includes a topping turbine. The topping turbine operates when the system is in a cogeneration plant mode, generating steam at higher temperatures and pressures. When the solar energy loop is offline (i.e., when the system is not in a cogeneration plant mode), the steam may be directed to the main turbine bypassing the topping turbine.

The above description of the hybrid power plant refers to pressurized water as the primary fluid in the nuclear energy loop, water/steam as the secondary fluid in the electrical generation loop, and molten salt as the heat transfer fluid/tertiary fluid in the solar energy loop. Other fluids are also contemplated for each of these loops. For example, steam, supercritical $CO_2$, air, $H_2$, or He could be used as the heat transfer fluid in the solar energy loop. As another example, a liquid metal could be used as the primary fluid in the nuclear energy loop, such as sodium, NaK, lead, or lead-bismuth.

The following examples are for purposes of further illustrating the present disclosure. The examples are merely illustrative and are not intended to limit the disclosure to the materials, conditions, or process parameters set forth therein.

EXAMPLES

A computer simulation (ASPEN) was conducted to calculate the potential gains in efficiency that could be achieved in a nuclear power plant by adding one or more heat exchangers as part of a solar energy loop.

The "SH Pressure" and the "SH Temperature" refer to the pressure and the temperature of the superheated steam, not to the pressure and temperature in a particular location. The acronym "FWHT" refers to the feedwater heater, reference numeral 16 in FIG. 2.

Example 1

The simulation of Example 1 included the base nuclear setup of FIG. 1 with steam reheat.

Example 2

The simulation of Example 2 added a molten salt superheater (7') to the setup of Example 1, and removed the steam reheat.

Example 3

The simulation of Example 3 added a molten salt reheater (8') to the setup of Example 2.

Example 4

The simulation of Example 4 added a molten salt primary water heater (9') to the setup of Example 3, and also operated at higher pressure than Example 3 (2400 psia vs. only 900 psia).

Example 5

The simulation of Example 5 was identical to Example 4, but operated at higher superheater and reheater temperatures (1050° C. vs. 1000° C.).

Example 6

The simulation of Example 6 was identical to Example 4, but operated at a higher reheater temperature.

Example 7

The simulation of Example 7 was identical to Example 4, but operated at a lower reheater pressure of 400 psia vs. 600 psia.

RESULTS

Table 1 summarizes the results. The ASPEN simulations show that the gross efficiency of the plant can be increased from near 32% to near 42%, which is a 10 percentage point increase. Note that these examples merely show the type of increase that is possible, and should not be construed as limiting the efficiency improvement.

TABLE 1

| Example | Water flow (lbs/hr) | SH Pressure (psia) | SH Temp (° F.) | Reheat Temp (° F.) |
|---|---|---|---|---|
| 1 | 6250007 | 900 | 567 | 500 |
| 2 | 6250007 | 900 | 1000 | NA (694) |
| 3 | 6250007 | 900 | 1000 | 1000 |
| 4 | 6250007 | 2400 | 1000 | 1000 |
| 5 | 6250007 | 2400 | 1050 | 1050 |
| 6 | 6250007 | 2400 | 1000 | 1050 |
| 7 | 6250007 | 2400 | 1000 | 1000 |

| Example | FWHT Outlet Temp (° F.) | Nuclear Thermal Input (MWt) | Molten salt thermal input SH (MWt) | Molten salt thermal input RH (MWt) |
|---|---|---|---|---|
| 1 | 345 | 1670 | 0 | 0 |
| 2 | 371 | 1670 | 453 | 0 |
| 3 | 355 | 1670 | 487 | 262 |
| 4 | 355 | 900 | 522 | 323 |
| 5 | 359 | 900 | 672 | 326 |
| 6 | 355 | 900 | 611 | 368 |
| 7 | 355 | 900 | 611 | 392 |

| Example | Molten salt thermal input primary water heater (MWt) | Gross power generated (MWe) | Gross efficiency (%) |
|---|---|---|---|
| 1 | 0 | 536 | 32.1 |
| 2 | 0 | 759 | 35.8 |
| 3 | 0 | 901 | 37.2 |
| 4 | 557 | 960 | 41.7 |
| 5 | 522 | 998 | 41.2 |
| 6 | 522 | 985 | 41.0 |
| 7 | 522 | 991 | 40.9 |

In addition to raising the steam temperature, raising the pressure of the secondary fluid allows further improvements to overall plant efficiencies. Preliminary estimates of the efficiency gains shown in Table 1 indicate that the gross efficiencies of the nuclear plant can be raised from approximately 32% to 37% by simply increasing the temperature of the steam. Further increases require increasing the pressure of the secondary fluid. When the pressure is increased on the secondary side, so does the saturation temperature, which can also be accomplished.

The present disclosure has been described with reference to exemplary embodiments. Obviously, modifications and alterations will occur to others upon reading and understanding the preceding detailed description. It is intended that the present disclosure be construed as including all such modifications and alterations insofar as they come within the scope of the appended claims or the equivalents thereof.

The invention claimed is:

1. A solar-nuclear hybrid electrical generation plant, comprising:
a nuclear energy loop including a primary fluid that runs through a nuclear reactor, a steam generator downstream of the nuclear reactor, and a primary water heater located between the nuclear reactor and the steam generator;
a solar energy loop including a heat transfer fluid that runs through a solar receiver and the primary water heater downstream of the solar receiver; and
an electrical generation loop including a secondary fluid that runs through the steam generator of the nuclear energy loop and at least one turbine downstream of the steam generator;
wherein heat energy is transferred from the heat transfer fluid in the solar energy loop to the primary fluid in the nuclear energy loop.

2. The plant of claim 1, further comprising a superheater located in the electrical generation loop between the steam generator and the at least one turbine wherein the superheater is downstream of the solar receiver in the solar energy loop.

3. The plant of claim 2, wherein the at least one turbine includes a high-pressure turbine and a low-pressure turbine downstream of the high-pressure turbine, and further comprising a reheater located in the electrical generation loop between the high-pressure turbine and the low-pressure turbine wherein the reheater is downstream of the solar receiver in the solar enery loop.

4. The plant of claim 3, wherein the primary water heater is downstream of the reheater in the solar energy loop.

5. The plant of claim 4, further comprising a preheater located in the electrical generation loop upstream of the steam generator and downstream of the at least one turbine, wherein the preheater is downstream of the primary water heater in the solar energy loop.

6. The plant of claim 3, wherein further comprising a preheater located in the electrical generation loop upstream of the steam generator and downstream of the at least one turbine, wherein the preheater is downstream of the reheater in the solar energy loop.

7. The plant of claim 2, wherein the primary water heater is downstream of the superheater in the solar energy loop.

8. The plant of claim 7, further comprising a preheater located in the electrical generation loop upstream of the steam generator and downstream of the at least one turbine, wherein the preheater is downstream of the primary water heater in the solar energy loop.

9. The plant of claim 2, further comprising a preheater located in the electrical generation loop upstream of the steam generator and downstream of the at least one turbine, wherein the preheater is downstream of the superheater in the solar energy loop.

10. The plant of claim 1, wherein the at least one turbine includes a high-pressure turbine and a low-pressure turbine downstream of the high-pressure turbine, and futher comprising a reheater located in the electrical generation loop between the high-pressure turbine and the low-pressure turbine wherein the reheater is downstream of the solar receiver in the solar energy loop.

11. The plant of claim 10, wherein the primary water heater is downstream of the reheater in the solar energy loop.

12. The plant of claim 11, further comprising a preheater located in the electrical generation loop upstream of the steam generator and downstream of the at least one turbine, wherein the preheater is downstream of the primary water heater in the solar energy loop.

13. The plant of claim 10, further comprising a preheater located in the electrical generation loop upstream of the steam generator and downstream of the at least one turbine, wherein the preheater is downstream of the reheater in the solar energy loop.

14. The plant of claim 1, further comprising a preheater located in the electrical generation loop upstream of the steam generator and downstream of the at least one turbine, wherein the preheater is downstream of the primary water heater in the solar energy loop.

15. The plant of claim 1, further comprising a preheater located in the electrical generation loop upstream of the steam generator and downstream of the at least one turbine wherein the preheater is downstream of the solar receiver in the solar energy loop.

16. The plant of claim 1, wherein the solar energy loop further comprises a cold tank and a hot tank, the hot tank being located downstream of the solar receiver and upstream of the primary water heater, and the cold tank being located upstream of the solar receiver and downstream of the primary water heater.

17. The plant of claim 16, wherein cooler heat transfer fluid from the cold tank can be mixed with hotter heat transfer fluid from the hot tank prior to sending the heat transfer fluid through the primary water heater.

18. The plant of claim 1, further comprising a pump in the nuclear energy loop located downstream of the nuclear reactor and upstream of the steam generator, and also comprising a valve downstream of the steam generator for controlling the pressure of the primary fluid entering the nuclear reactor.

19. A solar-nuclear hybrid electrical generation plant, comprising:
- a nuclear energy loop including a primary fluid that runs through a nuclear reactor and a steam generator downstream of the nuclear reactor;
- a solar energy loop including a heat transfer fluid that runs through a solar receiver and two or more heat exchangers downstream of the solar receiver; and
- an electrical generation loop including a secondary fluid that runs through the steam generator of the nuclear energy loop, a higher pressure turbine stage downstream of the steam generator, and a lower pressure turbine stage downstream of the higher pressure turbine stage;
- wherein solar energy is transferred from the heat transfer fluid to the primary fluid or the secondary fluid through the two or more heat exchangers; and
- wherein one of the two or more heat exchangers is a primary water heater located in the nuclear energy loop downstream of the nuclear reactor and upstream of the steam generator.

20. The plant of claim 19, wherein another of the two or more heat exchangers is selected from the group consisting of:
- (A) a superheater located in the electrical generation loop downstream of the steam generator and upstream of the higher pressure turbine stage;
- (B) a reheater located in the electrical generation loop between the higher pressure turbine stage and the lower pressure turbine stage; and
- (C) a preheater located in the electrical generation loop upstream of the steam generator and downstream of the lower pressure turbine stage.

* * * * *